Jan. 6, 1970   D. L. BRETTINGEN   3,487,579
BLOCKS INCLUDING MEANS FOR INTERLOCKING THEM AT PLURAL ANGLES
Filed Feb. 1, 1966   4 Sheets-Sheet 1
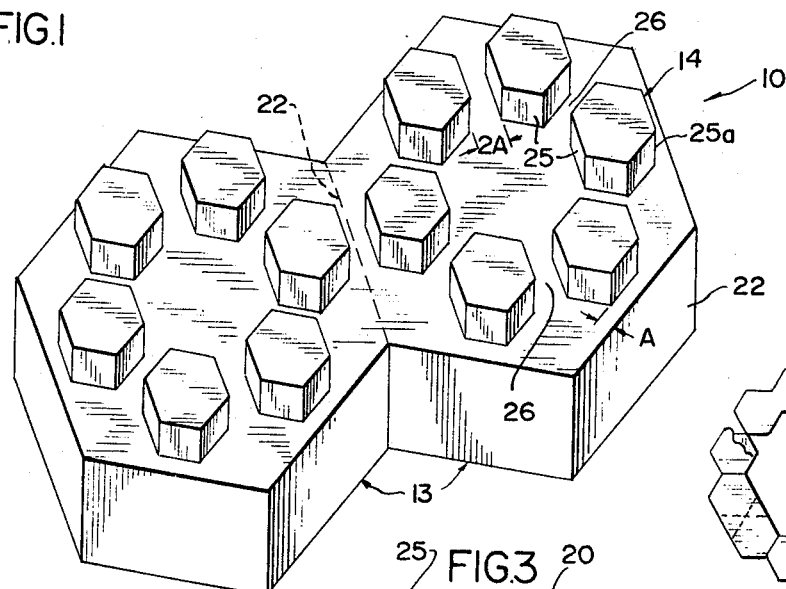
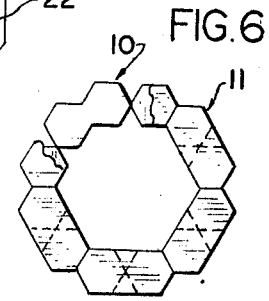
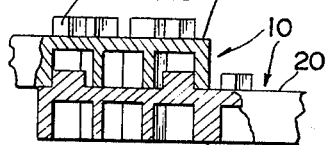
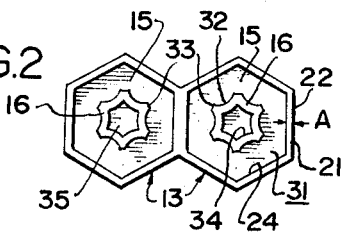
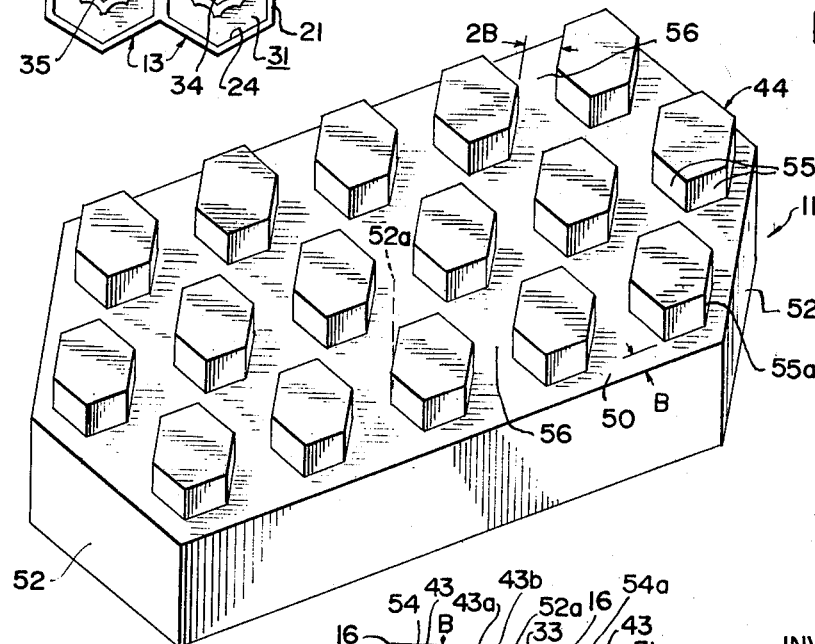
INVENTOR
DAVID L. BRETTINGEN
BY Evan D. Roberts
ATTORNEY Jan. 6, 1970　　　D. L. BRETTINGEN　　　3,487,579
BLOCKS INCLUDING MEANS FOR INTERLOCKING THEM AT PLURAL ANGLES
Filed Feb. 1, 1966　　　　　　　　　　　　　　　　4 Sheets-Sheet 2
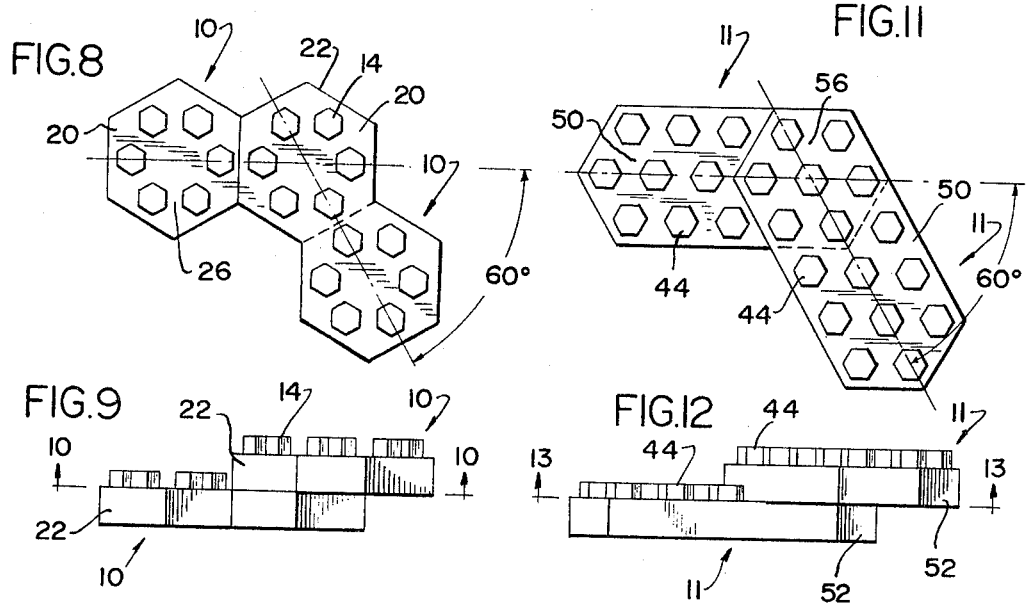
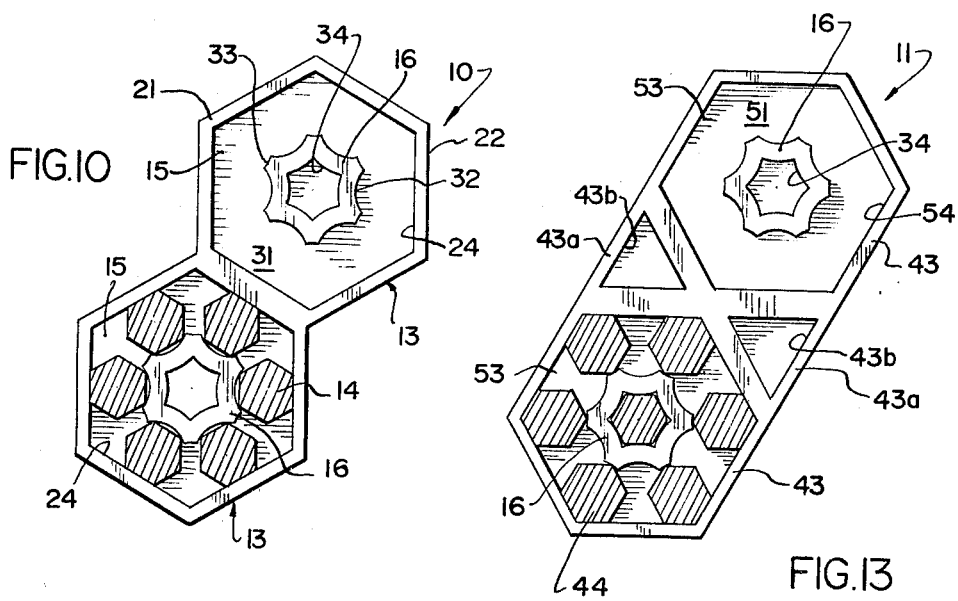
INVENTOR
DAVID L. BRETTINGEN
BY Evan D. Roberts
ATTORNEY Jan. 6, 1970     D. L. BRETTINGEN     3,487,579
BLOCKS INCLUDING MEANS FOR INTERLOCKING THEM AT PLURAL ANGLES
Filed Feb. 1, 1966                         4 Sheets-Sheet 3

INVENTOR
DAVID L. BRETTINGEN
BY *Evan D. Roberts*
ATTORNEY

Jan. 6, 1970  D. L. BRETTINGEN  3,487,579
BLOCKS INCLUDING MEANS FOR INTERLOCKING THEM AT PLURAL ANGLES
Filed Feb. 1, 1966  4 Sheets-Sheet 4

INVENTOR
DAVID L. BRETTINGEN
BY Evan D. Roberts
ATTORNEY

United States Patent Office

3,487,579
Patented Jan. 6, 1970

3,487,579
BLOCKS INCLUDING MEANS FOR INTERLOCKING THEM AT PLURAL ANGLES
David L. Brettingen, 74 Ash, Park Forest, Ill. 60466
Filed Feb. 1, 1966, Ser. No. 524,051
Int. Cl. A63h *33/08;* E04c *1/10, 1/30*
U.S. Cl. 46—25
7 Claims

ABSTRACT OF THE DISCLOSURE

Building block structures are disclosed herein to provide illustrations of this invention. These blocks include joined geometrical regular sections having cavities on one side and projections on the other to provide interlocking relationship with similar blocks at a number of positions equal to the number of sides of the geometrical section.

---

This invention relates to building blocks, and in particular, to building blocks adapted to be interconnected in flush or staggered and overlapping positions and in selected angular relative relationship.

There are existing types of building blocks that can be interconnected in aligned or right angle overlapping relation, but not in laterally staggered and in multiple angular relations. Others have a structure whereby blocks can be overlapped in random or infinitely variable angular relation without angular support. However, the first general types are generally not versatile enough and the other types are generally not adequate angularly supported and are not accurately angularly positionable.

Therefore, it is the primary object of this invention to provide building blocks which can be interconnected in aligned or laterally staggered and multiple predetermined angular overlapping relationships with accurate angular support.

With these and other objects in view, this invention contemplates building blocks having a body of two joining geometrically regular sections which have projections extending from the upper surface thereof, and a similar regular geometrical cavity in each section with a central interior frame for engaging projections of other blocks to retain the blocks in overlapping and aligned or angular relationship.

Other objects, advantages and novel aspects of the invention will become apparent upon consideration of the following detailed description, in conjunction with the accompanying drawings wherein:

FIG. 1 is a perspective view of a first block of this invention;

FIG. 2 is a bottom of the first block;

FIG. 3 is a partial sectional view showing the interconntected relationship between two of the first blocks;

FIG. 4 is a perspective view of a second block of this invention;

FIG. 5 is a bottom view of the second block of this invention;

FIG. 6 is a top view of a geometrically regular structure assembled from a combination of the first and second blocks;

FIG. 7 is a side view of the assembled structure of FIG. 6;

FIG. 8 is a top view of two of the first blocks shown in overlapping 60° angular relationship;

FIG. 9 is a side view of the blocks shown in FIG. 8;

FIG. 10 is an enlarged sectional view taken along line 10—10 of FIG. 9 showing the inter-relationship between the projections, cavities and interior frames of the two first blocks shown in FIGS. 8 and 9;

FIG. 11 is a top view of two of the second blocks shown in overlapping 60° angular relationship;

FIG. 12 is a side view of the blocks shown in FIG. 11;

FIG. 13 is an enlarged sectional view taken along line 13—13 of FIG. 12 showing the inter-relationship between the projections, cavities and interior frames of the two second blocks shown in FIGS. 11 and 12;

Figure 14:
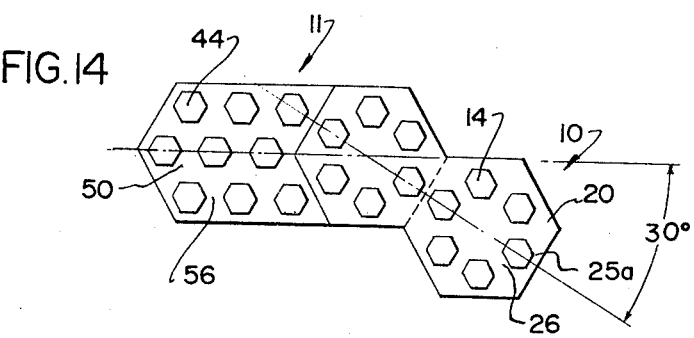
FIG. 14 is a top view of a first block over a second block in 30° angular relationship.

This invention includes first and second building block forms respectively generally designated by the numerals 10 and 11. The first block 10 (FIG. 1) includes generally, two geometrically regular sections 13 with projections 14, a cavity 15, and an interior retaining frame 16 as connecting means in each section 13.

The sections 13 (FIGS. 1–3) of each block 10 are provided with contiguous upper surfaces 20 and contiguous lower surfaces 21 with sides 22 extending therebetween. The sections 13 are joined along a side 22 shown by the broken line (FIG. 1). Further, each section 13 is provided with a cavity 15 in the bottom surface 21 thereof, which is similar in horizontal cross section to the section 13 itself, and is in registry therewith. The cavity 15 thus provides inside surfaces 24 in each one thereof respectively parallel with the outer surfaces 22 and which provide a panel or wall A extending around each section 13 having a thickness A (FIG. 2).

The projections 14 (FIG. 1) are arranged in a regular geometric pattern on the upper surface 20 of each section similar to the cross section of the section 13 itself. Each projection 14 is provided with sides 25 which are respectively parallel with the sides 22 of the section 13 from which the projections 14 extend, and are respectively positioned inwardly from the side 22 midway between the corners thereof at a distance A.

Facing sides 25 of each adjacent projection 14 form a channel 26 having a dimension 2A which may be slightly less than twice the thickness A of the wall and which, if extended, would be in alignment with a similar channel 26 formed by facing sides 25 of the projections 14 directly opposite on the upper surface 20 of the section 13.

Figure 16:
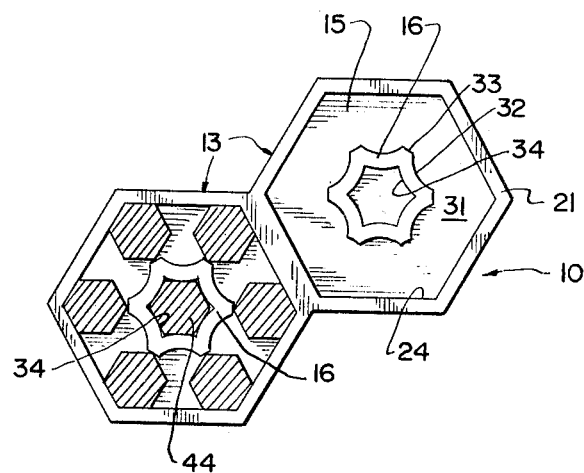
FIG. 16 is an enlarged sectional view taken along line 16—16 of FIG. 15 showing the inter-relationship between the projections, cavities and interior frames of a first block used with a second block.
Figure 17:
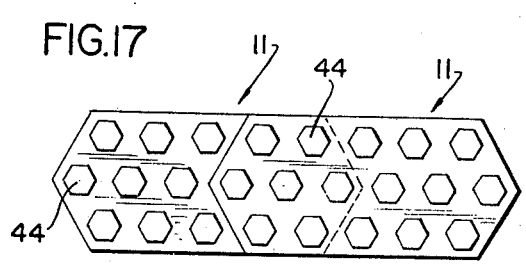
FIG. 17 is a top view of two of the second blocks in aligned overlapping relationship.

The interior retaining frame 16 (FIG. 2) is secured to an upper surface 31 of the cavities 15 and extends downwardly therein to a plane substantially common to the bottom surface 21 of the sections 13. The frame 16 is provided with alternate large and small concave surfaces 32 and 33 respectively in the outer periphery thereof (FIGS. 2, 10, 13 and 16), and convex surfaces 34 defining an interior cavity 35 adapted to frictionally receive and retain any of the projections 14 or 44 as hereinafter shown (FIG. 16).

It should be noted that the large concave surfaces are positioned directly opposite the center of the inner surfaces 24 and the small concave surfaces are positioned directly opposite and centered on the corners between the surfaces 24. Thus, when one block is placed with one section 13 thereof over and in registry with a section 13 of another block (FIGS. 8–10), the projections 14 on the lower block 10 each have an outer side 25 in engagement with an inner surface 24 of the cavity and two corners 25a in line engagement with the adjacent large concave surface 32 of the retainer 16 as indicated by the broken lines.

Figure 22:
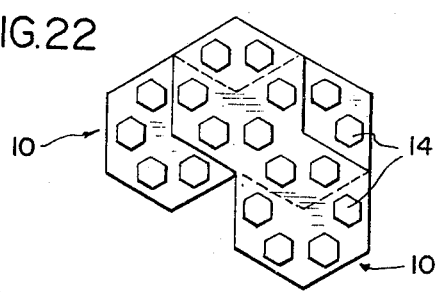
FIG. 22 is a top view of two of the first blocks in overlapping 60° relationship.
Figure 23:
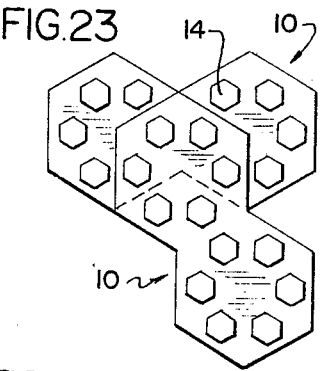
FIG. 23 is a top view of two of the first blocks in overlapping, 60° angular relationship.
Figure 25:
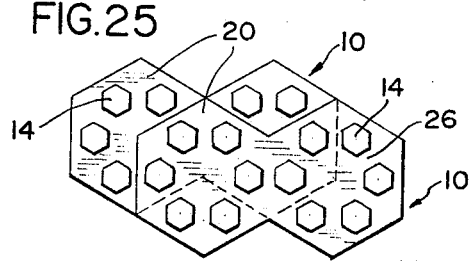
FIG. 25 is a top view of two of the first blocks in overlapping, staggered relationship.
Figure 24:
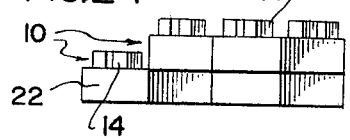
FIG. 24 is a front view of the block shown in FIG. 23.
Figure 26:
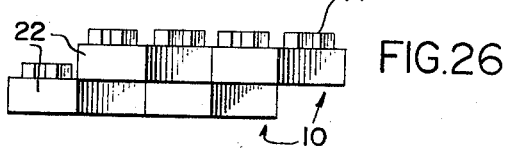
FIG. 26 is a front view of the blocks shown in FIG. 25.

Similarly, if the two blocks 10 are placed in staggered relationship (FIG. 22), the projections 14 of the lower blocks 10 will engage the surfaces 24 of the cavity 23 and surfaces 32 of the retainer of the other block in the same manner as described above except only in the overlapping areas. In this latter situation, the wall of the section will pass through selected channels 26 between the projections 14, so that inside surface 24 of the wall having a thickness A will be in frictional contact with the sides 25 of the projection 14 along which it is positioned.

It should be noted that the geometry provided by the block 10 of this invention provides generally among other things, for angular positioning between any two blocks 10 in 60° increments, one of which is shown (FIG. 8), due to the six-sided regular geometric arrangement of the basis elements thereof. Also, it should be noted that the projections 14 of the lower block 10 (FIGS. 8–10), are retained in respective saddle-like manner with surfaces 25 and corners 25a in respective engagement with surfaces 24 and the large concave retainer surfaces 32 to provide stability of engagement therebetween.

The second block 11 (FIG. 4) includes generally, two geometrically regular sections 43, with projections 44, a cavity 53 and an interior retaining frame 16 as connecting means in each section 43. The sections 43 of each block 11 are provided with contiguous upper surfaces 50 and a contiguous lower surfaces 51 with sides 52 extending therebetween. The sections 43 are joined along a outer corner 52a (FIGS. 4 and 5) shown by the broken line 52a (FIG. 4) and are provided with regular triangular-shaped filler portions 43a having walls with a thickness B and a triangular cavity 43b adapted to frictionally receive either of the projections 14 or 44 of blocks 10 or 11 respectively. The fillers 43a also make the block 11 flat sided and stronger with a wall B in width.

Further, each section 43 is provided wtih a cavity 53 in the bottom surface 51 thereof, which is similar in horizontal cross section to the section 43 itself, and is in registry therewith. The cavity 53 thus provides inside surfaces 54 in each cavity respectively parallel with surfaces 52 and which provide the panel or wall B extending around each section 43.

The projections 44 are arranged in a regular geometric pattern on the upper surface 50 of each section similar to the cross section of the section 43 itself. Each projection 44 is provided with sides 55 which are respectively parallel with the sides 52 of the section 43 from which the projections 44 extend. The projections 44 are positioned inwardly from the side 52 at the corners thereof a distance B from the sides 52 slightly less than the thickness of the wall B with one projection in the center of each section 43 as well as one in each filler 43a.

Facing sides 55 of each adjacent projection 44 form a channel 56 having a dimension 2B which may be slightly less than twice the thickness B of the wall and which, if extended, would be in alignment with a similar channel 56 formed by facing sides 55 of the projections 44 diagonally opposite on the upper surface 50 of the section 43.

The interior retaining frame 16 that is used in the first block 10 is likewise provided in the second block 11 (FIGS. 5, 10, 13 and 16). It should be noted, however, that the large concave surfaces 32 are positioned directly opposite the center of the inner surfaces 54 and the small concave surfaces 33 are positioned directly opposite and centered on the corners 54a between the surfaces 54. Thus, when one block 11 is placed with one section 43 thereof over and in registry with a section 43 of another block 11 (FIGS. 11–13), the peripheral projections 44 each have two outer sides 55 thereof in engagement with an inner surface 54 of the cavity 53 and a corner 55a of a projection 44 in engagement with the small retainer surface 33 opposite a corner 54a as indicated. Also, the center projection 44 will be in frictional engagement with the surfaces 34 of the inner cavity 35 of the retainer 16.

Figure 19:
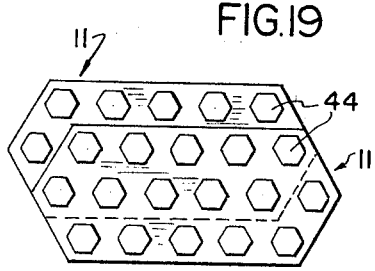
FIG. 19 is a top view of two of the second blocks in overlapping staggered relationship.
Figure 18:
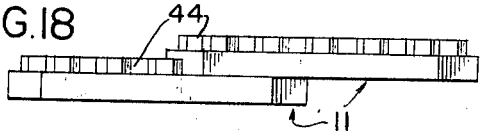
FIG. 18 is a side view of the two second blocks.
Figure 20:
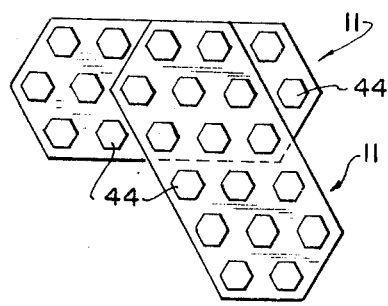
FIG. 20 is a top view of two of the second blocks in overlapping offset 60° angular relationship.
Figure 21:
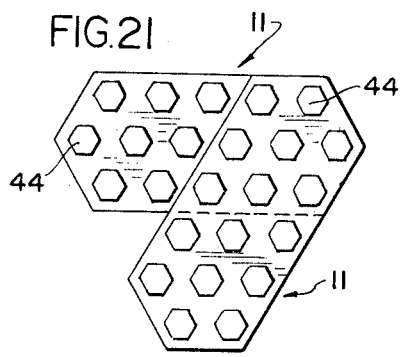
FIG. 21 is a top view of two of the second blocks in overlapping 120° angular relationship.

Similarly, if the two blocks 11 are placed in staggered relationship (FIG. 19), the projections 44 of one block 11 will engage the surfaces 54 of the cavity 53 and surfaces 32 of the retainer 16 of the other block 11 in the same manner in the overlapping areas. In this latter situation, the wall of the section 43 will pass through selected channels 56 between the projections 44, so that inside surface 54 of the wall B will be in frictional contact with the sides 55 of the adjacent projection or projections 44 along which it is positioned.

It should be noted that the geometry provided by the block 11 of this invention provides generally, among other things, for angular positioning between any two blocks 11 in 60° increments, one of which is shown (FIG. 11), due to the six-sided regular geometric arrangement of the basic elements thereof. Also, it should be noted that the projections 44 of the lower block 11 (FIGS. 11–13) are retained in respective saddle-like manner in engagement with the small concave retainer surfaces 32 to provide stability of engagement therebetween.

Figure 15:
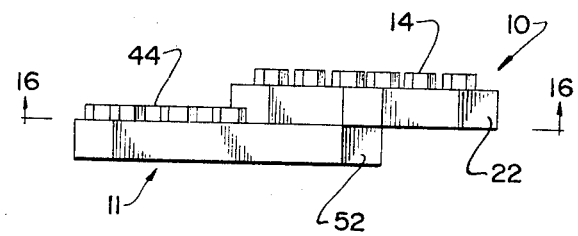
FIG. 15 is a side view of the blocks shown in FIG. 14.

Blocks 10 and 11 may be used in combination (FIGS. 14–16) as well as with blocks of their own type. This is accomplished in much the same manner as above described in regard to FIGS. 8–10 and 11–13 except that when blocks 10 and 11 are used in combination, a different result is obtained as another object of this invention.

In particular, when blocks 10 or 11 are used with blocks of their own type, the blocks can form, between themselves, six different angular positions 60° apart, and for example, the upper block may be 60° from alignment with the lower (FIGS. 8–10 and 11–13).

However, when a block 10 is used under a block 11, a different angular position will exist therebetween. In this situation, the upper block 11 will assume one of six different angular positions at 60° increments relative to the bottom block 10. Also, the specific positions will be 30° spaced from the positions provided by the combination of two like blocks. For a simple example (FIGS. 14–16), the upper block can be positioned 30° from alignment with the bottom block. Thus, by appropriately choosing the appropriate combination of blocks 10 under blocks 11, the blocks will provide a total of twelve angular positions at 30° increments.

When a block 11 is used under a block 10 (FIGS. 14–16), the angular positioning between the blocks 10 and 11 will be similar to that above described; however, it will nevertheless be somewhat different. In particular, the combination of a block 11 under a block 10 provides a situation, wherein the angular positions between the blocks will consist of six different angular positions at 60° increments relative to the bottom block 11 provided there is sufficient offset between the blocks in certain instances and the overlapping sections thereof are not always in registry.

When the overlapping sections of the blocks in this situation are not offset and are in registry, the relative angular positions therebetween will be somewhat more limited due to the interference of the projections 44 of block 11 with the walls A of block 10 in the overlapping portions of the sections of the blocks, outside the overlapping sections which are in registry. For example, when a block 11 is used under a block 10 with the section of one block in registry with the section of another block, there will be from one to six 60° angular positions possible instead of the six that are possible when a block 10 is used under a block 11 or like blocks are used with each other. Thus, by appropriately choosing the the appropriate combination of blocks 11 under blocks 10, or like blocks together in combination therewith, the blocks thus utilized will provide a possibility of a total of twelve angular positions at 30° increments, provided an offset between the blocks is utilized to prevent the specific interference situations above described.

Regardless of what two combination of blocks 10 or 11 are used, the projections of one will be received by the cavity walls and commonly shaped retainer 16 to frictionally hold the blocks together. In this regard, it should be noted that in all cases, a corner 25a or 55a of the projections is positioned against a concave retainer surface 32 or 33 to provide a saddle-like engagement for lateral retention of the projections.

Thus, due to the unique configuration of the retainer 16 common to both blocks 10 and 11 and the unique geometric block configuration including the projections and cavities of the sections thereof, building block structures and unique results are provided which were heretofore unknown.

It is to be understood that the invention is not to be limited to the specific constructions and arrangements shown and described, as it will be understood to those skilled in the art that changes may be made without departing from the principles of the invention.

What is claimed is:

1. Building blocks comprising block bodies each having two geometrically regular adjoining sections with contiguous upper surfaces and contiguous lower surfaces and straight side surfaces, connecting means on said block including multiple section projections in a symmetrical and aligned spaced-apart regular geometric arrangement on each section extending perpendicularly from said upper surface thereof with projection sides respectively parallel with the sides of said sections to receive a section wall adjacent any side of said projections, said connecting means further including a geometrically regular cavity formed in the bottom surface of each section thereof with the cavity sides respectively parallel with the adjacent sides of said sections to provide a section wall for each section side, said section walls being adapted to frictionally engage the projections of another of said blocks to retain said blocks together in horizontally parallel overlapping relationship and in a selected one of a number of angular relative positions equal to the number of sides of the regular cavity in the bottom of said block sections, said connecting means further including an interior retaining frame secured to each of said blocks within each of the cavities and spaced from the sides thereof and having a continuous series of concave surfaces on the outer sides thereof respectively directly opposite said sides and corners of the cavity, each of said concave surfaces being adapted for engaging one of the projections of another of said blocks between said frame and the side of the cavity.

2. Building blocks as defined in claim 1 wherein one of said interior retaining frames is secured to said block within each of the cavities, said concave surfaces being alternating large and small concave outer surfaces on the outer side thereof respectively opposite the sides and corners of the cavity in which it is secured for engaging the projections of another of said blocks between the frame and the side of the cavity.

3. Building blocks as defined in claim 1 wherein said projections have a geometrically regular cross section similar to the section and are respectively positioned centrally between the corners of said section with the outermost side thereof spaced inwardly from the top edge of said top surface a distance substantially equal to the thickness of the section wall.

4. Building blocks as defined in claim 1 wherein said sections of one of said blocks are symmetrically joined at a corner thereof.

5. Building blocks as defined in claim 4 wherein one of said interior retaining frames is secured to each of said blocks within each of the cavities thereof and said connecting means further includes an inner cavity in said frame having a surface to engage one of the projections of another of said blocks within the inner cavity.

6. Building blocks as defined in claim 1, wherein sections of one of said blocks are symmetrically joined along a side thereof and said sections of another of said blocks are symmetrically joined along a corner thereof.

7. Building blocks as defined in claim 6, wherein one of said interior retaining frames is secured to each of said blocks within each of the cavities thereof and said connecting means further includes an inner cavity of said frame having a surface to receive and frictionally engage one of said projections of another of either of said blocks.

References Cited

UNITED STATES PATENTS

| | | | |
|---|---|---|---|
| 2,861,388 | 11/1958 | Favaretto | 46—25 X |
| 3,005,282 | 10/1961 | Christiansen | 46—25 |
| 3,196,579 | 7/1965 | Lepper. | |

FOREIGN PATENTS

| | | |
|---|---|---|
| 229,861 | 8/1960 | Australia. |
| 1,256,070 | 2/1961 | France. |
| 996,811 | 6/1965 | Great Britain. |

F. BARRY SHAY, Primary Examiner

U.S. Cl. X.R.

52—594